United States Patent
McGlothlin et al.

[15] 3,658,701
[45] Apr. 25, 1972

[54] DRILLING FLUID

[72] Inventors: Raymond E. McGlothlin; James C. Baggett, both of Houston, Tex.

[73] Assignee: Dresser Industries, Inc., Dallas, Tex.

[22] Filed: Dec. 9, 1968

[21] Appl. No.: 783,176

[52] U.S. Cl. ..................252/8.5 P, 252/8.5 M, 252/8.55 R
[51] Int. Cl. ......................................C10m 1/06, C10m 1/10
[58] Field of Search ........................252/8.5 P, 8.5 M, 8.55 A

[56] References Cited

UNITED STATES PATENTS

| | | | |
|---|---|---|---|
| 1,575,945 | 3/1926 | Stroud | 252/8.5 |
| 2,497,398 | 2/1950 | Dawson | 252/8.5 |
| 2,779,735 | 1/1957 | Brown et al. | 252/8.55 |
| 2,862,881 | 12/1958 | Reddie | 252/8.5 |
| 2,943,051 | 6/1960 | Lummus | 252/8.5 |
| 2,946,746 | 7/1960 | Keller | 252/8.5 |
| 3,107,349 | 1/1962 | Fischer | 252/8.5 |
| 3,021,277 | 2/1962 | Hoeppel | 252/8.5 |
| 3,041,275 | 6/1962 | Lummus et al. | 252/8.5 |
| 3,046,222 | 7/1962 | Phansalkar et al. | 252/8.55 |

*Primary Examiner*—Herbert B. Guynn
*Attorney*—Robert W. Mayer, Daniel Rubin, Peter J. Murphy, Frank S. Troidl, Roy L. Van Winkle, William E. Johnson, Jr. and Roderick W. MacDonald

[57] ABSTRACT

Oil base drilling fluids which contain a metal oxide such as manganese oxide as a high temperature fluid loss control agent.

2 Claims, No Drawings

DRILLING FLUID

BACKGROUND OF THE INVENTION

The premise that an organic liquid such as oil is better than water-base materials for drilling fluids is a matter of long standing in the petroleum industry. As an outgrowth of this premise, what is termed in the petroleum industry as "oil-base" drilling emulsions and "invert" drilling emulsions have been developed.

"Oil-base" drilling emulsions are those which contain a large amount, e.g., 95 weight per cent, of an organic material as the external phase of the emulsion. The remainder of the emulsion is a minor amount of an aqueous phase as the internal phase of the emulsion. Thus, "oil-base" emulsions are water-in-oil emulsions. Of course, such emulsions contain emulsifiers, weighting agents, and other additives which help give the emulsion the desired physical properties for its intended use.

The organic base is one which is substantially a hydrocarbon material. Examples of such materials include crude oil, Diesel oil, heavy petroleum refinery liquid residues, asphalt in its normal state, asphalt which has been oxidized by bubbling air therethrough to increase the softening point of the asphalt, lamp black, and the like. Thus, this invention applies to any organic base material or materials conventionally used in preparing "oil-base" drilling emulsions.

Those emulsions which are normally termed "invert emulsions" are a species of water-in-oil emulsions which employs organic materials similar to those employed in "oil-base" drilling emulsions but which contains smaller amounts of the organic, external phase and larger amounts of the aqueous, internal phase. This invention applies to conventional "invert emulsions" whatever their organic base may be and, therefore, are referred to herein as invert organic drilling emulsions. It should be understood that these emulsions employ organic base materials which are substantially hydrocarbon materials as explained hereinabove with regard to the organic base drilling emulsions.

Heretofore, organic base drilling emulsions and invert organic drilling emulsions have consistently exhibited unduly high fluid loss, especially when used at elevated temperatures, i.e., temperatures of at least 250° F.

This omnipresent problem is well known in the art. For example, W. F. Rogers in his book "Composition and Properties of Oil Well Drilling Fluids," 3rd Edition, Gulf Publishing Company, Houston, Texas, 1963, indicates on page 562 that crude oil does not give good plastering properties and usually gives high fluid loss and that even the use of high viscosity asphalt base crude petroleums still gives large fluid losses, e.g., several hundred cubic centimeters during only 30 minutes test time.

Thus, filtration rate reduction, i.e., reduction in fluid loss, has been a problem of long standing with organic base drilling emulsions and invert organic drilling emulsions and is an even greater problem when operating temperatures for the drilling fluid reach or exceed 250° F.

SUMMARY OF THE INVENTION

In accordance with this invention, it was unexpectedly discovered that the liquid filtration rate of organic base drilling emulsions and invert organic drilling emulsions can be substantially reduced at both operating temperatures below 250° F., and, more importantly, operating temperatures above 250° F., preferably from about 250° to about 500° F. These results are achieved by employing in the emulsion one of manganese oxide, molybdenum oxide, tungsten oxide, vanadium oxide, lead oxide, and mixtures of at least two of these oxides.

In addition, it has been found that a particularly good drilling fluid additive can be formed from one or more of the above recited oxides and an asphaltic material which has a softening point of at least 250° F., the oxide or oxides and asphaltic material or materials being present in the additive in the weight range ratio of about 0.25–1/0.25–1.

The emulsions of this invention and the additives of this invention are useful in drilling fluids in general. Drilling fluids include drilling muds used for drilling in completing, or working over wells, for packer fluids, and the like. The emulsions and additives of this invention are particularly useful in wells which are subject to reduced productivity and/or shale sloughing when water base muds are used, and for drilling deep and/or hot wells which normally encounter technical difficulties and high cost for keeping water base muds in good condition and organic base muds in a condition of minimum liquid filtration rate.

Accordingly, it is an object of this invention to provide new and improved organic drilling emulsions, particularly organic base drilling emulsions and invert organic drilling emulsions. It is another object of this invention to provide a procedure for reducing the liquid filtration rate of organic emulsions at both low and high operating temperatures, particularly operating temperatures of at least 250° F. It is another object of this invention to provide a new and improved drilling fluid additive, particularly for organic drilling fluids. It is yet another object of this invention to provide a new and improved drilling additive useful for substantially reducing the liquid filtration rate of organic base drilling emulsions and invert organic drilling emulsions, particularly at temperatures of at least 250° F.

Other aspects, objects, and advantages of this invention will be apparent to those skilled in the art from this disclosure and appended claims.

In accordance with this invention organic, i.e., substantially hydrocarbon, base drilling emulsions and invert organic drilling emulsions are provided which contain an effective emulsifying amount of an organic soluble emulsifier together with an aqueous internal phase, the emulsion in addition containing a metal oxide as set forth hereinabove, preferably $MnO_2$, $MoO_3$, $WO_3$, $V_2O_5$, $PbO$, and mixtures of at least two thereof. The oxide(s) are employed in amounts sufficient to substantially reduce the liquid filtration rate of the emulsion. A substantial reduction in filtration rate means a reduction of at least 10 percent over the filtration rate achieved when none of the above metal oxides are present.

Generally, the metal oxides can be used in widely varying amounts depending upon the particular emulsion, its various constituents and amounts thereof, its desired use, and the like. The amount of metal oxide or oxides employed can be from about 1 to about 10 weight per cent.

The emulsions can additionally contain, if desired, and if not already present in the organic base material, from about 1 to about 10 weight per cent of an asphaltic material of one of bitumen, asphalt, asphaltenes, and mixtures of at least 2 thereof, the asphaltic material or materials employed each having a softening point of at least 250° F. A particularly desirable material is Gilsonite which is one of the purest (99.9 percent) naturally occurring bitumens. A full and complete description of Gilsonite can be found in the Condensed Chemical Dictionary edited by the Chemical Engineering Catalogs, 3rd Edition, 1942, Reinhold Publishing Corp., New York, New York. It is preferred that the ratio of metal oxide in the emulsion to the asphaltic additive employed, if any, be in the range ratio of about 0.25–1/0.25–1.

The emulsions can also contain conventional clays in the amounts of from about 1 to about 3 weight per cent. Suitable clays include kaolins (Kaolinite, Halloysite, Dickite, Nacrite, and Endellite), bentonites (Montmorillonite, Beidellite, Nontronite, Hectorite, and Saponite), hydrous micas (Bravaisite or Illite), attapulgite, sepiolite, and the like.

The emulsions can also contain conventional weighting additives such as barium sulfate, barium carbonate, mixtures thereof, and the like. The weighting additive or additives employed in a given emulsion are used to give that emulsion a predetermined weight per gallon. Thus, an effective weighting amount of these materials is normally used and this weighting amount can vary widely depending upon the desired result. Generally, with an organic base drilling emulsion sufficient weighting material is added to give the final emulsion a density of from about 7.2 to about 22 pounds per U.S. gallon. For invert organic drilling emulsions sufficient weighting material is added to give a density of from about 8.3 to about 22 pounds per U.S. gallon.

Since this invention is applicable to conventional organic emulsions, it can be used with emulsifiers of widely varying composition. The emulsions will normally include an organic-soluble emulsifier, the composition of which varies widely. For example, metal soaps of tall oil, resin oil, fatty acids, and the like can be employed with or without solubilization with ethylene oxide, amines, amides, and the like.

The aqueous phase can also vary widely in composition from fresh water to water containing large amounts of dissolved electrolytes, e.g., inorganic salts such as sodium chloride, potassium chloride, magnesium chloride, calcium sulfate, and the like. Thus, the aqueous phase can be fresh water, salt water, brackish water, brine, and the like.

Although the composition of the emulsions can vary widely, the invention can be employed with organic base emulsions which contain from about 80 to about 95 weight per cent Diesel oil, from about 1 to about 5 weight per cent asphalt having a softening point of at least 250° F., and from about 1 to about 3 weight per cent of at least one alkaline earth metal soap of fatty acids. The fatty acids can be saturated, unsaturated, or mixtures thereof and can have from 16 to 22 carbon atoms per molecule. The alkaline earth metals employed in the fatty acid soaps are preferably calcium, magnesium, strontium, and barium, still more preferably calcium and magnesium. The remainder of the emulsion is substantially the internal aqueous phase. This emulsion can contain other additives such as those set forth hereinabove and those not mentioned herein but conventional in the art.

Similarly, an invert organic emulsion composition of this invention can contain from about 50 to about 80 weight per cent Diesel oil, and from about 1 to about 3 weight per cent alkaline earth metal fatty acid soap as disclosed hereinabove, the remainder being essentially the internal aqueous phase and optional additives mentioned hereinabove or not mentioned but conventional in the art.

The drilling fluid additive of this invention is composed of one or more of the above-described metal oxides and an asphaltic material of one of bitumen, asphalt, asphaltenes, and mixtures of at least 2 thereof, each asphaltic material having a softening point of at least 250° F. The metal oxide or oxides are present in the additive in a weight range ratio of oxide to asphaltic material of about 0.25–1/0.25–1.

A preferred additive is a mixture of manganese dioxide and Gilsonite in the weight range ratio specified hereinabove, still more preferably in about a 1/1 weight ratio.

The drilling fluid additive and emulsions of this invention can be formed in a conventional manner such as by adding the individual constituents in any order or in any combination with other constituents. The addition of constituents to one another can be with contemporaneous and/or subsequent stirring, the addition and stirring being carried out under ambient conditions of temperature, pressure, and atmosphere. Generally, the stirring employed is that degree of stirring for that time which yields a substantially homogeneous mixture. Stirring can be employed for at least 10 minutes, preferably from about 20 to about 40 minutes using a conventional mixer.

In this disclosure, unless otherwise specified, all weight percentages are based on the total weight of the emulsion, all liquid filtration rates (fluid loss) are determined in accordance with the American Petroleum Institute's standard procedure for testing drilling fluids, Section 3, High Temperature-High Pressure Test, and all softening points are determined in accordance with the standard ASTM test D36–64T.

EXAMPLE I

Two invert organic drilling emulsions were formed, one with a metal oxide according to this invention and one without a metal oxide. Each emulsion was tested for its high temperature, high pressure filtration rate after heat aging at both 300° F. and 450° F.

Both emulsions were formed from Diesel oil, air oxidized asphalt having a softening point of 310° F., a magnesium fatty acid soap formed from fatty acid moieties having from 16 to 22 carbon atoms per molecule, water saturated with sodium chloride, and barium sulfate.

Each emulsion was formed by first providing 19.6 weight per cent Diesel oil, adding thereto 1.3 weight per cent fatty acid soap, thereafter adding 0.8 weight per cent of the asphalt, and finally adding the aqueous phase and barium sulfate. The addition steps of all the constituents were carried out with stirring at room temperature under ambient conditions of pressure and atmosphere using a Hamilton Beach mixer set at 75 volts. After the last constituent was added stirring was continued for 10 minutes.

After the stirring was completed, the emulsions were tested and the results are set forth hereinbelow in Table I.

TABLE I

| Emulsion type | Test temperature, °F. | Length of test, hrs. | 300° F./500 p.s.i.g.[1] |
|---|---|---|---|
| NoMnO₂ | 300 | 16 | 6.4 with 0 cc. water. |
| | 450 | 16 | 100 with 12 cc. water. |
| With MnO₂ | 300 | 16 | 2.4 with 0 cc. water. |
| | 450 | 16 | 14.2 with 0.4 cc. water. |

[1] Fluid loss with cubic centimeters of water found in filtrate.

It can be seen from the above data that at the elevated temperatures of 300° F. and 450° F. the emulsion which contained no metal oxide exhibited a substantial fluid loss and that at 450° F. the emulsion was breaking down in a substantial manner as indicated by the 12 cubic centimeters of water in the filtrate.

It can further be seen from the data that with the addition of the metal oxide in accordance with this invention the same emulsion when tested at the same temperatures exhibited approximately a 66 percent lower fluid loss at 300° F. and approximately an 80 percent reduction in fluid loss at 450° F. with substantially no break down of the emulsion.

EXAMPLE II

Two samples of a field invert organic drilling emulsion were tested, one with a metal oxide according to this invention and one without a metal oxide. Each sample was tested for its high temperature, high pressure filtration rate after heat aging at 475° F.

The emulsions were formed from Diesel oil, oxidized asphalt, a calcium soap of a mixture of aliphatic fatty acid, and polymerized rosin acids, a supplemental emulsifier-wetting agent of a polynitrogen containing compound, water saturated with electrolytes, and barium sulfate.

This emulsion had been used for several thousand feet of drilling and had begun having a high filtration rate at bottom hole temperatures in excess of 425° F. Conventional fluid loss control additives were not effective in controlling the filtration loss. The results can be seen in Table II.

TABLE II

| Emulsion type | Test temperature, °F. | Length of test, hrs. | 475° F./850 p.s.i.g.[1] |
|---|---|---|---|
| No MnO₂ | 475 | 16 | 82.0 with 20 cc. water. |
| With MnO₂ | 475 | 16 | 19.2 with 0 cc. water. |

[1] Fluid loss with cubic centimeters of water found in filtrate.

It can be seen from the above data that at the elevated temperature of 475° F. the emulsion which contained no metal oxide had almost no filtration control with a high degree of degradation as indicated by the 20 cc. of water in the filtrate.

It can further be seen from the data that with the addition of the metal oxide in accordance with this invention the same emulsion when tested at the same temperature exhibited approximately a 75 percent lower fluid loss with no breakdown of the emulsion.

Reasonable variations and modifications are possible within the scope of this disclosure without departing from the spirit and scope of the invention.

We claim:

1. A fluid loss control agent effective at temperatures of greater than 250° F. consisting essentially of (1) a metal oxide of manganese, and (2) at least one asphaltic material selected from the group consisting of bitumen, asphalt and asphaltenes, the asphaltic material having a softening point of at least 250° F., (1) and (2) being present in a weight range ratio of about 0.25–1/0.25b–1.

2. The additive according to claim 1 wherein said asphaltic material is the bitumen Gilsonite.

* * * * *

UNITED STATES PATENT OFFICE
CERTIFICATE OF CORRECTION

Patent No. 3,658,701          Dated April 25, 1972

Inventor(s)    Raymond E. McGlothlin et al.

It is certified that error appears in the above-identified patent and that said Letters Patent are hereby corrected as shown below:

On the cover sheet [72], insert -- Roger L. Schultz, Houston, Tex. --.

Signed and sealed this 6th day of March 1973.

(SEAL)
Attest:

EDWARD M. FLETCHER, JR.             ROBERT GOTTSCHALK
Attesting Officer                    Commissioner of Patents